(12) United States Patent
Hardt (10) Patent No.: US 10,003,855 B2
(45) Date of Patent: Jun. 19, 2018

(54) SET-TOP BOX USER INTERFACE FOR INTERNET OF THINGS DEVICES

(71) Applicant: ARRIS Enterprises LLC, Suwanee, GA (US)

(72) Inventor: Charles Hardt, Lawrenceville, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days. days.

(21) Appl. No.: 15/192,149

(22) Filed: Jun. 24, 2016

(65) Prior Publication Data

US 2017/0006348 A1  Jan. 5, 2017

Related U.S. Application Data

(60) Provisional application No. 62/188,224, filed on Jul. 2, 2015.

(51) Int. Cl.
| | |
|---|---|
| *H04N 21/488* | (2011.01) |
| *H04N 21/41* | (2011.01) |
| *H04N 21/214* | (2011.01) |
| *H04N 21/422* | (2011.01) |
| *H04N 21/40* | (2011.01) |
| *G08B 13/196* | (2006.01) |

(52) U.S. Cl.
CPC ....... *H04N 21/4882* (2013.01); *G08B 13/196* (2013.01); *H04N 21/2143* (2013.01); *H04N 21/40* (2013.01); *H04N 21/41* (2013.01); *H04N 21/4104* (2013.01); *H04N 21/4122* (2013.01); *H04N 21/4131* (2013.01); *H04N 21/422* (2013.01); *H04N 21/42202* (2013.01)

(58) Field of Classification Search
None
See application file for complete search history.

(56) References Cited

U.S. PATENT DOCUMENTS

| 5,825,407 | A  | * | 10/1998 | Cowe ................... | H04H 20/103 |
|---|---|---|---|---|---|
| | | | | | 348/485 |
| 6,002,994 | A  | * | 12/1999 | Lane ....................... | G01W 1/17 |
| | | | | | 702/188 |
| 2006/0224660 | A1 | * | 10/2006 | Negishi .............. | H04N 1/00885 |
| | | | | | 709/201 |
| 2014/0219478 | A1 | * | 8/2014 | Takahashi ............... | H04S 1/007 |
| | | | | | 381/119 |
| 2014/0292638 | A1 | * | 10/2014 | Lee ..................... | G06K 9/00604 |
| | | | | | 345/156 |
| 2015/0163412 | A1 | * | 6/2015 | Holley .................. | G05B 15/02 |
| | | | | | 348/143 |

* cited by examiner

*Primary Examiner* — Justin Shepard
(74) *Attorney, Agent, or Firm* — Bart A. Perkins (57) ABSTRACT

Methods, systems, and computer readable media can be operable to facilitate the monitoring and control of one or more network devices via a user interface. One or more network devices capable of communicating with a client device, such as a set-top box (STB) may output a message to the STB upon the occurrence of a predetermined alarm event. The STB may generate a notification including information associated with the alarm event and may output the notification to one or more display devices. The notification may further include one or more options for responding to the alarm event, and the STB may take action according to an option selected by a user.

12 Claims, 8 Drawing Sheets

SET-TOP BOX USER INTERFACE FOR INTERNET OF THINGS DEVICES

CROSS REFERENCE TO RELATED APPLICATION

This application is a non-provisional application claiming the benefit of U.S. Provisional Application Ser. No. 62/188,224, entitled "Set-Top Interface for Internet of Things Devices," which was filed on Jul. 2, 2015, and is incorporated herein by reference in its entirety.

TECHNICAL FIELD

This disclosure relates to a user interface for Internet of things devices.

BACKGROUND

Typically, multiple services (e.g., video, voice, data, etc.) are received at a subscriber premise by a customer premise equipment device (e.g., gateway device), and the multiple services are provided to consumers over a local network (e.g., local area network (LAN), wireless local area network (WLAN), multimedia over coax alliance (MoCA) network, etc.). Devices connected to the local network may be configured to receive services offered by a service provider (e.g., multiple systems operator (MSO)) and may be configured to communicate with other devices connected to the local network.

The types of devices that may be connected to a local network continues to grow in number. For example, local network access is not limited to only multimedia devices (e.g., set-top boxes (STB), televisions, mobile devices, tablets, etc.), but is now available to a multitude of other home and personal devices (e.g., Internet of things (IoT) devices) such as appliances (oven/stove, dishwasher, air conditioner/furnace, etc.), wearables, home automation devices, health monitoring devices or equipment, automobile sensors, security systems, and others. Once connected to a local or home network, these devices may communicate with each other over the local or home network.

However, subscribers are left without a means for monitoring and easily accessing communications that may be passed between component devices making up the home network. Moreover, subscribers are without a system for integrating networked devices and a common user interface for monitoring and interacting with networked devices. For example, a message indicating that an action needs to be taken at a networked device may not be received by a user or the user may simply ignore the message. Moreover, a user might ignore or forget about an action that needs to be taken at a network device (e.g., IoT device). Also, there is no common method or device that may be used to configure network devices within a premise. Therefore, it is desirable to improve upon methods and systems for providing a user interface that allows a user to monitor and/or control devices connected to a home network.

BRIEF DESCRIPTION OF THE DRAWINGS

Like reference numbers and designations in the various drawings indicate like elements.

DETAILED DESCRIPTION

It is desirable to improve upon methods and systems for interfacing with network devices of a subscriber premise. Methods, systems, and computer readable media can be operable to facilitate the monitoring and control of one or more network devices via a user interface. One or more network devices capable of communicating with a client device, such as a set-top box (STB) may output a message to the STB upon the occurrence of a predetermined alarm event. The STB may generate a notification including information associated with the alarm event and may output the notification to one or more display devices. The notification may further include one or more options for responding to the alarm event, and the STB may take action according to an option selected by a user.

An embodiment of the invention described herein may include a method comprising: (a) receiving an indication of an alarm event, wherein the indication is received at a first device connected to a local network, and wherein the alarm event comprises a condition occurring at a second device; (b) generating a notification window, wherein the notification window comprises information associated with the alarm event; and (c) outputting the notification window as a user interface to one or more display devices.

According to an embodiment of the invention, the notification window comprises one or more options for responding to the alarm event.

According to an embodiment of the invention, the method described herein further comprises: (a) receiving a user selection of one of the one or more options for responding to the alarm event; and (b) outputting a communication from the first device to the second device, the communication instructing the second device according to the user-selected option for responding to the alarm event.

According to an embodiment of the invention, the first device comprises a set-top box.

According to an embodiment of the invention, the indication is delivered to the first device from the second device as a wireless communication.

According to an embodiment of the invention, the method described herein further comprises outputting a communication to one or more devices, the communication instructing the one or more devices to output an audible notification that identifies the alarm event.

According to an embodiment of the invention, the method described herein further comprises, when a display device of the one or more display devices is in a power off state when the notification window is output to the display device, causing the display device to: (a) switch to a power on state; (b) display the notification window; and (c) return to a power off state once confirmation is received that the alarm event has been addressed.

An embodiment of the invention described herein may include an apparatus comprising: (a) one or more interfaces configured to be used to receive an indication of an alarm event, wherein the alarm event comprises a condition occurring at a client device; (b) a notification module configured to generate a notification window, wherein the notification window comprises information associated with the alarm event; and (c) wherein the one or more interfaces are further configured to output the notification window as a user interface to one or more display devices.

According to an embodiment of the invention, the notification window comprises one or more options for responding to the alarm event.

According to an embodiment of the invention, the one or more interfaces are further configured to be used to: (a) receive a user selection of one of the one or more options for responding to the alarm event; and (b) output a communication to the client device, the communication instructing the client device according to the user-selected option for responding to the alarm event.

According to an embodiment of the invention, the indication is received at the one or more interfaces from the client device as a wireless communication.

According to an embodiment of the invention, the one or more interfaces are further configured to be used to output a communication to one or more devices, the communication instructing the one or more devices to output an audible notification that identifies the alarm event.

According to an embodiment of the invention, the one or more interfaces are further configured to be used to output a communication to the one or more display devices that, when a display device receiving the communication is in a power off state, causes the display device to: (a) switch to a power on state; (b) display the notification window; and (c) return to a power off state once confirmation is received that the alarm event has been addressed.

An embodiment of the invention described herein may include one or more non-transitory computer readable media having instructions operable to cause one or more processors to perform the operations comprising: (a) receiving an indication of an alarm event, wherein the indication is received at a first device connected to a local network, and wherein the alarm event comprises a condition occurring at a second device; (b) generating a notification window, wherein the notification window comprises information associated with the alarm event; and (c) outputting the notification window as a user interface to one or more display devices.

According to an embodiment of the invention, the notification window comprises one or more options for responding to the alarm event.

According to an embodiment of the invention, the instructions are further operable to cause the one or more processors to perform the operations comprising: (a) receiving a user selection of one of the one or more options for responding to the alarm event; and (b) outputting a communication from the first device to the second device, the communication instructing the second device according to the user-selected option for responding to the alarm event.

According to an embodiment of the invention, the first device comprises a set-top box.

According to an embodiment of the invention, the indication is delivered to the first device from the second device as a wireless communication.

According to an embodiment of the invention, the instructions are further operable to cause the one or more processors to perform the operations comprising outputting a communication to one or more devices, the communication instructing the one or more devices to output an audible notification that identifies the alarm event.

According to an embodiment of the invention, the instructions are further operable to cause the one or more processors to perform the operations comprising, when a display device of the one or more display devices is in a power off state when the notification window is output to the display device, causing the display device to: (a) switch to a power on state; (b) display the notification window; and (c) return to a power off state once confirmation is received that the alarm event has been addressed.

Figure 1:
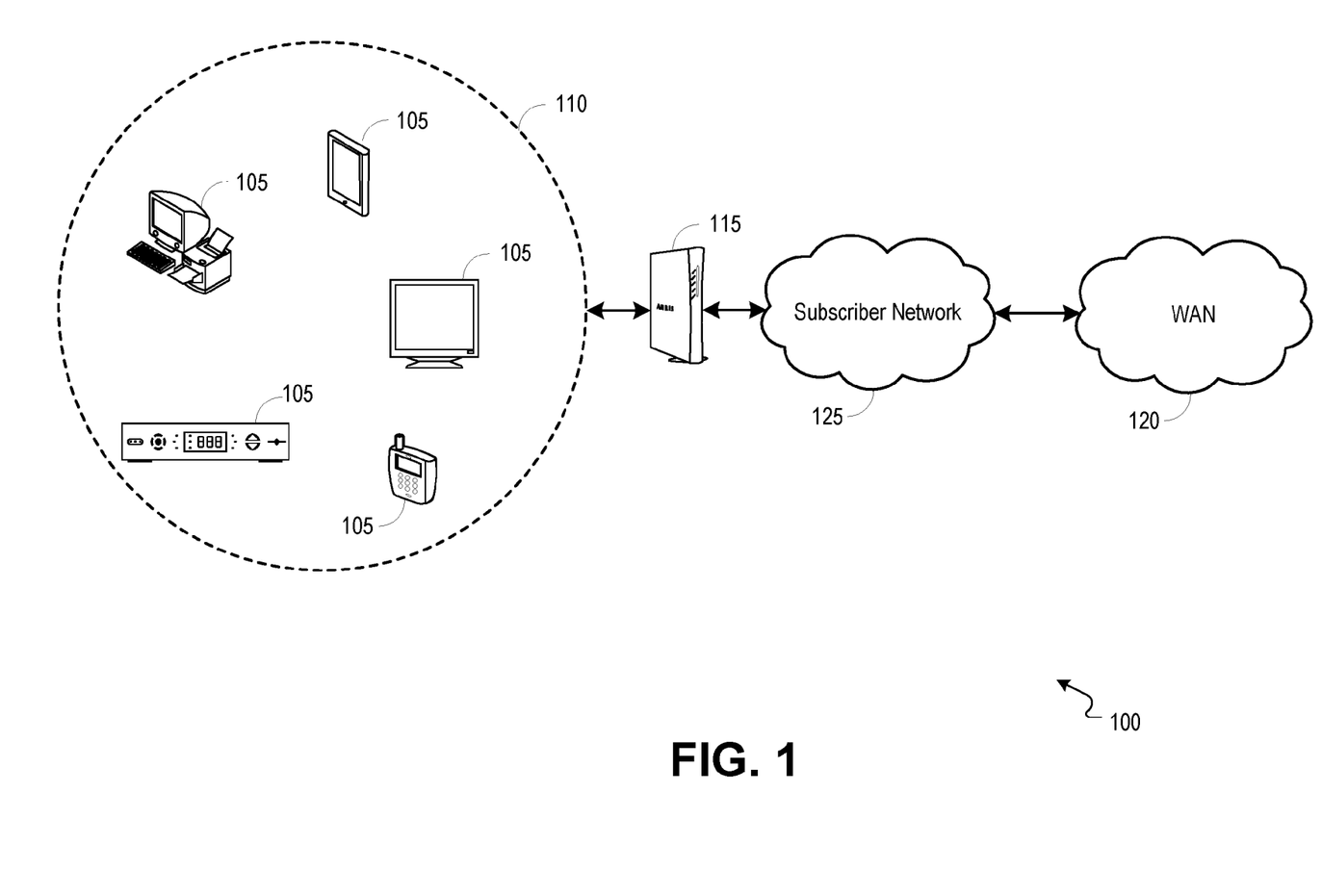
FIG. 1 is a block diagram illustrating an example network environment operable to facilitate the monitoring and control of one or more network devices via a user interface.

FIG. 1 is a block diagram illustrating an example network environment 100 operable to facilitate the monitoring and control of one or more network devices via a user interface. In embodiments, video, voice, and/or data services may be delivered to one or more client devices 105. Client devices 105 may include a television, mobile device, tablet, computer, set-top box (STB), gaming device, access points (APs), and any other device operable to receive video, voice, and/or data services. Client devices 105 may include Internet of things (IoT) devices such as appliances, wearables, home automation devices, and any other home or personal device configured to communicate over a local network. It should be understood that various services may be delivered to the client devices 105, including but not limited to, live or broadcast television, video-on-demand (VoD) content, pay-per view content, recorded content (e.g., DVR content), audio-only content, streaming content such as YouTube or Netflix content, and other various video, data, and/or voice services. It should be further understood that the devices shown in FIG. 1 may be integrated. For example, a television or other display device may be connected to and receive content from a STB.

Multiple services may be delivered to and communications may be passed between client devices 105 over a local network 110. The local network 110 may include a local area network (LAN), wireless local area network (WLAN), personal area network (PAN), mobile hotspot network, and others. The local network 110 may be provided at a subscriber premise by a central device 115. The central device 115 may include a gateway device, modem device, combination thereof or other access device. It will be appreciated by those skilled in the relevant art that delivery of the multiple services over the local network 110 may be accomplished using a variety of communication protocols, standards, and formats, and that client devices 105 may be capable of interacting and communicating with each other and/or with a central device 115 over various wireless communication standards (e.g., Wi-Fi, Zigbee, Bluetooth, etc.) or wired communication standards (e.g., Ethernet, Multimedia over Coax Alliance (MoCA), etc.).

In embodiments, multiple services (e.g., video, voice, and/or data services) may be delivered from a wide-area network (WAN) 120 to the local network 110 through a connection to a subscriber network 125. The subscriber network 125 may include an optical network, hybrid fiber coaxial (HFC) network, twisted-pair, mobile network, high-speed data network, satellite network, and others.

In embodiments, client devices 105 such as IoT devices may connect to a STB via any number of protocols, and the STB may operate as a user interface to each of the connected client devices 105. For example, the STB may output a display presenting a user with command/control options for each device, and/or the STB may output a display of a notification that communicates to a user, any alerts and other messages received from the connected client devices 105. The STB may in turn present any/all messages to a user, or the STB may filter messages based on priority of the message, type of IoT device from which the message is received, or even the time of day. The STB may present a message to a user through a display device or other client device 105 that is associated with or connected to the STB.

A client device 105, such as a STB, may identify an alarm event occurring at another device. The client device 105 may be configured to respond to an alarm event by generating and outputting a notification window to a display device. The notification window may include information associated with the alarm event and may be displayed over any content that is currently being displayed at the display device. In embodiments, the notification window may include user-selectable options that, when selected, indicate a response action to be carried out by the client device 105. The response action may be instructing the device causing the alarm event, or another device associated with the subscriber network, to carry out a specified action in response to the alarm event. While several examples of alarm events and corresponding response actions are described herein, it will be appreciated by those skilled in the relevant art that various other types of alarm events and response actions may be identified by the client device(s) 105.

As an example, the device causing an alarm event may be an IoT device such as an oven. The homeowner may turn on the oven, place a food item in the oven, and set the timer for, as one example, ninety (90) minutes. The oven may be connected to the local network 110 and other client devices 105, such as a STB, via one or more of various technologies (e.g., WiFi, Ethernet, Bluetooth, etc.). The oven may be configured to inform the STB when the timer is about to expire or has expired. When the STB receives the message (i.e., the alarm event message) from the oven, the STB may simultaneously output a display of the message to one or more display devices that are capable of communicating over the local network 110. In embodiments, any of the client devices 105 (e.g., televisions) that are currently in the off state may be switched on (e.g., via a high definition multimedia interface (HDMI)), such that the user may receive the alarm event message. After switching the client device 105 from an off state to an on state, the client device 105 outputting the notification may cause the client device 105 that was previously in an off state to power down and return to the off state once an appropriate action corresponding to the notification has been taken.

After displaying the notification informing a user of the alarm event, the client device 105 may provide the user with one or more options for responding to the alarm event. For example, the user may then use an interface with the STB to communicate with the oven, possibly shutting the oven off, switching the oven to a "warming mode," or just ignoring the alert.

In embodiments, the notification of the alarm event may be output from the STB, or other client device 105, as an audio tone. For example, the notification may be output as an audio tone laid over program audio being output to a user. The audio notification may be a live voice notification or a pre-recorded notification.

As another example, the user may configure a security system to alert the user if the garage door is open after a certain time (e.g., 10:00 PM, etc.). If the security system recognizes the specified alarm event (i.e., the garage door being open after 10:00 PM), the security system may alert a client device 105 (e.g., STB) of the occurrence of the alarm event. The client device 105 may forward the notification of the alarm event to one or more display devices, and the user may be provided with an opportunity to close the garage door via a user interface displayed through the client device 105, or simply ignoring the alert message.

As yet another example, a home IoT enabled security system may detect that an exterior door of the home has opened. The security system may in turn alert a client device 105 (e.g., STB), and the client device 105 may forward the alert to a user by displaying a notification at one or more display devices. In embodiments, the client device 105 may be configured to require a user acknowledgement for certain types of alarm events, such as an exterior door being opened during a certain period of time. Alternatively, the client device 105 may be configured to allow the displayed notification to time out after a certain duration of time.

In embodiments, a user may request a general status update from all IoT devices within the home. The user may manually request the status update or may configure a client device 105 to deliver a status update to one or more display devices at a certain scheduled time. At the scheduled time, or when a user request for a status update is received by the client device 105, the client device 105 may query all IoT devices in the home for a current status. The client device 105 may then compile the retrieved status information and display the status information to a user as a user interface at one or more display devices. It will be appreciated by those skilled in the relevant art that various status update fields may be included in the notification for each of one or more IoT devices within the home.

Figure 2:
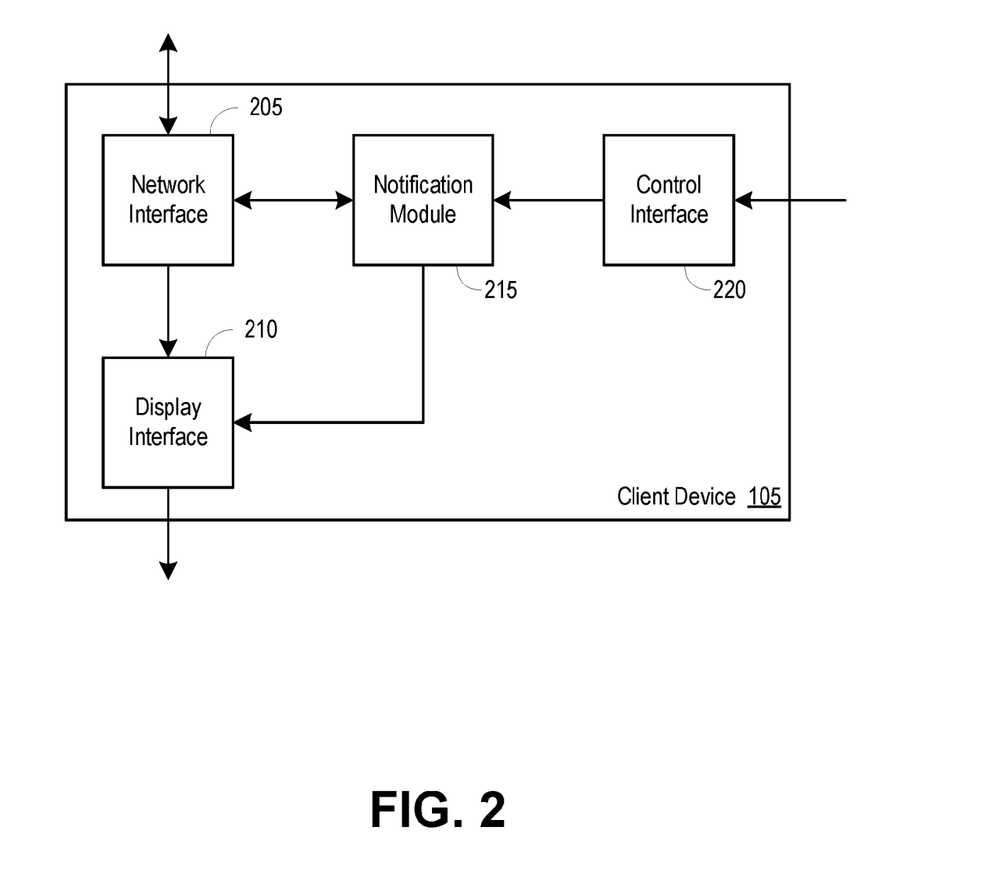
FIG. 2 is a block diagram illustrating an example client device operable to facilitate the monitoring and control of one or more network devices via a user interface.

FIG. 2 is a block diagram illustrating an example client device 105 operable to facilitate the monitoring and control of one or more network devices via a user interface. The client device 105 may be a STB, or any other device configured to output a communication to a multimedia device. The client device 105 may include a network interface 205, a display interface 210, a notification module 215, and a control interface 220. It should be understood that the generation of a notification overlaying content may occur at a client device 105 such as STB or at a central device 115 such as a gateway device.

The client device 105 may receive a notification of an alarm event from another device via the network interface 205. It will be appreciated by those skilled in the relevant art that various communication protocols and techniques, both wired and wireless, may be used to pass information from a networked device (e.g., IoT device) or central device (e.g., gateway device, access point, etc.) to the client device 105.

The notification module 215 may be configured to respond to the alarm event by generating and outputting a notification window to a display device through the display interface 210. The notification window may include information associated with the alarm event and may be displayed over any content that is currently being displayed at the display device.

In embodiments, the notification window may include user-selectable options that, when selected, indicate a response action to be carried out by the client device 105. For example, a user selection of a response action may be received through the control interface 220. The notification module 215 may be configured to identify the user-selected response action and may cause the response action to be carried out by the client device 105 or the notification module 215 may output an instruction to another device (i.e., the device causing the alarm event) to carry out the response action.

In embodiments, the notification window may provide a user with an option for closing the notification window, resuming normal playback of the content, or confirming that the alarm event has been addressed. For example, a signal may be received by the notification module 215 from a RCU (remote control unit) through the control interface 220. In embodiments, the notification module 215 may receive, through the network interface 205, a communication from a device (e.g., appliance, personal device, home automation device, etc.) associated with the alarm event, the communication providing a confirmation that the alarm event has been addressed.

Figure 3:
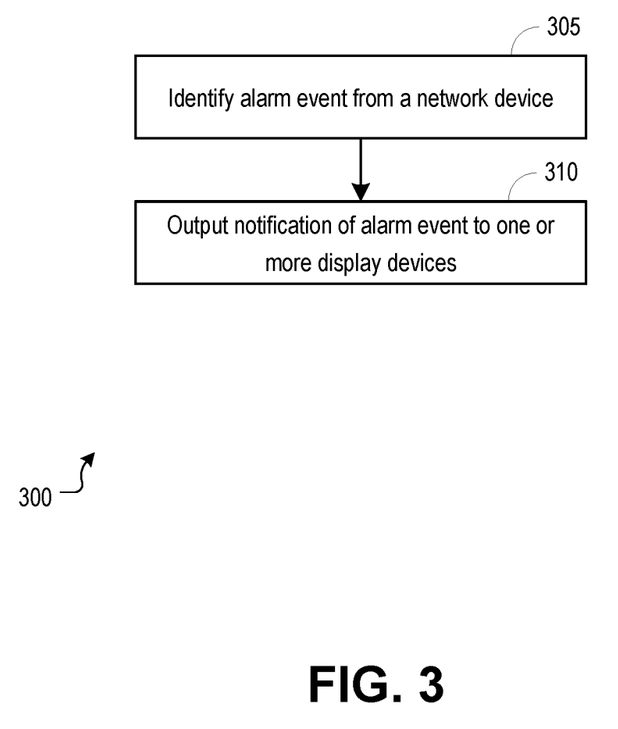
FIG. 3 is a flowchart illustrating an example process operable to facilitate the output of a user interface that notifies a user of an alarm event.

FIG. 3 is a flowchart illustrating an example process 300 operable to facilitate the output of a user interface that notifies a user of an alarm event. The process 300 can begin at 305, when an alarm event is identified as having occurred at a network device. The alarm event may occur at a networked device (e.g., client device 105 of FIG. 1 such as an IoT device), and the alarm event may be identified by a client device 105 such as a STB or multimedia gateway. In embodiments, the alarm event may be identified when a notification of the alarm event is received by the client device 105. For example, a STB may be configured to receive status updates from one or more other client devices 105 connected to a home network. It should be understood that the alarm event may be any of a wide variety of events recognized at any of a wide variety of client devices 105 (e.g., IoT devices).

At 310, a notification of the alarm event may be output to one or more display devices. For example, the client device 105 that identified the alarm event (e.g., STB, multimedia gateway, etc.) may output the notification to one or more display devices (e.g., television, mobile device, tablet, or other client device 105). The notification may be output as a notification window to a display. The notification window may be generated by a notification module 215 of FIG. 2 and may be output through a display interface 210 of FIG. 2 to the display device. The notification window may include an identifier or description of the alarm event, the device from which the notification of the alarm event was received, and/or other information associated with the alarm event. The notification window may be output to a display (e.g., television) as a window overlaying content that is being output to the display from the STB or multimedia gateway. It should be understood that the STB or gateway may output the notification in forms other than a notification window at a display device. For example, the STB or gateway may control another client device 105 (e.g., multimedia device, IoT device, etc.) and may cause the other client device 105 to output an audible notification indicating to a user the occurrence of the identified alarm event.

Figure 4:
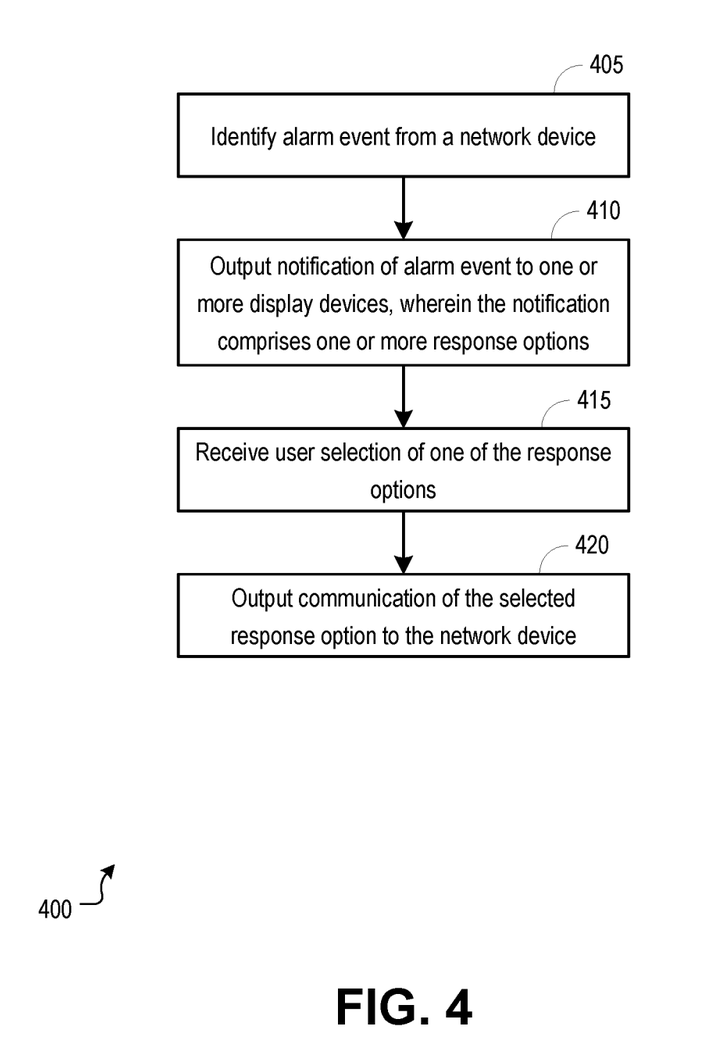
FIG. 4 is a flowchart illustrating an example process operable to facilitate the output of a user interface that notifies a user of an alarm event and provides a user with one or more options for responding to the alarm event.

FIG. 4 is a flowchart illustrating an example process 400 operable to facilitate the output of a user interface that notifies a user of an alarm event and provides a user with one or more options for responding to the alarm event. The process 400 can begin at 405, when an alarm event is identified as having occurred at a network device. The alarm event may occur at a networked device (e.g., client device 105 of FIG. 1 such as an IoT device), and the alarm event may be identified by a client device 105 such as a STB or multimedia gateway. In embodiments, the alarm event may be identified when a notification of the alarm event is received by the client device 105. For example, a STB may be configured to receive status updates from one or more other client devices 105 connected to a home network. It should be understood that the alarm event may be any of a wide variety of events recognized at any of a wide variety of client devices 105 (e.g., IoT devices).

At 410, a notification of the alarm event may be output to one or more display devices. For example, the client device 105 that identified the alarm event (e.g., STB, multimedia gateway, etc.) may output the notification to one or more display devices (e.g., television, mobile device, tablet, or other client device 105). The notification may be output as a notification window to a display. The notification window may be generated by a notification module 215 of FIG. 2 and may be output through a display interface 210 of FIG. 2 to the display device. The notification window may include an identifier or description of the alarm event, the device from which the notification of the alarm event was received, and/or other information associated with the alarm event. The notification window may be output to a display (e.g., television) as a window overlaying content that is being output to the display from the STB or multimedia gateway. In embodiments, the notification window may include one or more response options. Each of the one or more response options may provide a user with an option for responding to the alarm event. For example, response options may include actions to be taken by the device causing the alarm event, actions to be taken by the network device (e.g., output a notification to another device, close the notification window, etc.), and others. It should be understood that the one or more response options may be displayed within the notification window such that a user may scroll through the options (i.e., using an RCU or other control interface) and select a response option.

At 415, a user selection of one of the response options may be received. The user selection of the response option may be received and recognized, for example, by a notification module 215 of FIG. 2. The user selection may be received at a client device 105 from an RCU (or other control interface) or from another associated or connected client device. For example, a user may select a response option using an RCU that interfaces with a STB outputting a display of the notification window.

At 420, a communication identifying the selected response option may be output to the network device (i.e., the device causing the alarm event). The communication may be generated, for example, by the notification module 215. In embodiments, the communication may identify an action to be taken by the network device causing the alarm event (or a device other than the network device causing the alarm event). For example, the client device 105 generating the notification window (e.g., a STB) may be configured with predetermined response options for displaying when certain alarm events are identified, and the client device 105 may communicate the user-selected response option to a device corresponding with the response option.

Figure 5:
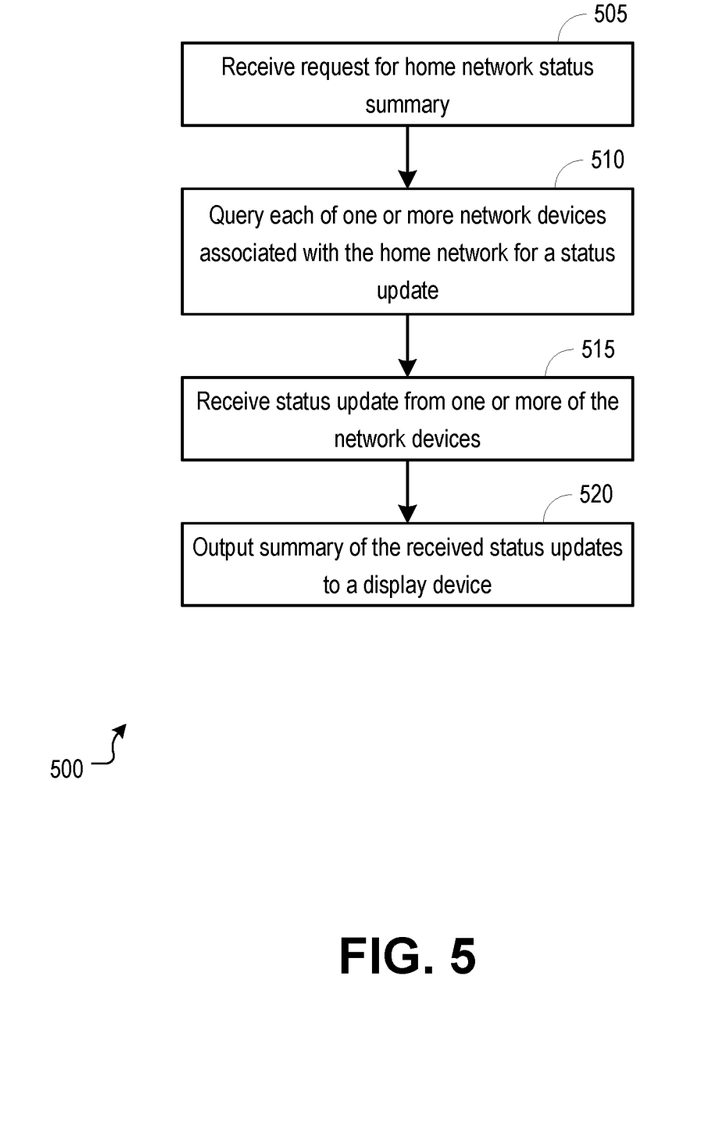
FIG. 5 is a flowchart illustrating an example process operable to facilitate the output of a user interface that provides a user with a status summary of a home network.

FIG. 5 is a flowchart illustrating an example process 500 operable to facilitate the output of a user interface that provides a user with a status summary of a home network. The process 500 can begin at 505 when a request for a home network status summary is received. The request for a home network status summary may be received, for example, at a client device 105 of FIG. 1 (e.g., by a notification module 215 of FIG. 2) such as a STB. A user may utilize a user interface or unique RCU button to send a home network status summary request to the client device 105.

At 510, each of one or more network devices associated with the home network may be queried for a status update. For example, the client device 105 may output a query to each of one or more devices (e.g., other client devices 105) that are capable of communicating over the home network. In embodiments, the query may include a request that the device output a status update to the client device 105.

At 515, a status update may be received from one or more of the network devices. The status updates may be received, for example, by the notification module 215 of FIG. 2. In embodiments, the status update may include information such as current power/battery level, current power state, operational status, and other information. It should be understood that a wide variety of different information may be recovered from a wide variety of devices as status updates.

At 520, a summary of the received status updates may be output to a display device. The summary of the received status updates may be generated and output, for example, by the notification module 215 of FIG. 2. The notification module 215 may compile the received status updates into a notification window, and may output the notification window to a display device. The notification window may include an identification of each of the one or more network devices and a current status or other status information associated with each of the one or more network devices.

Figure 6:
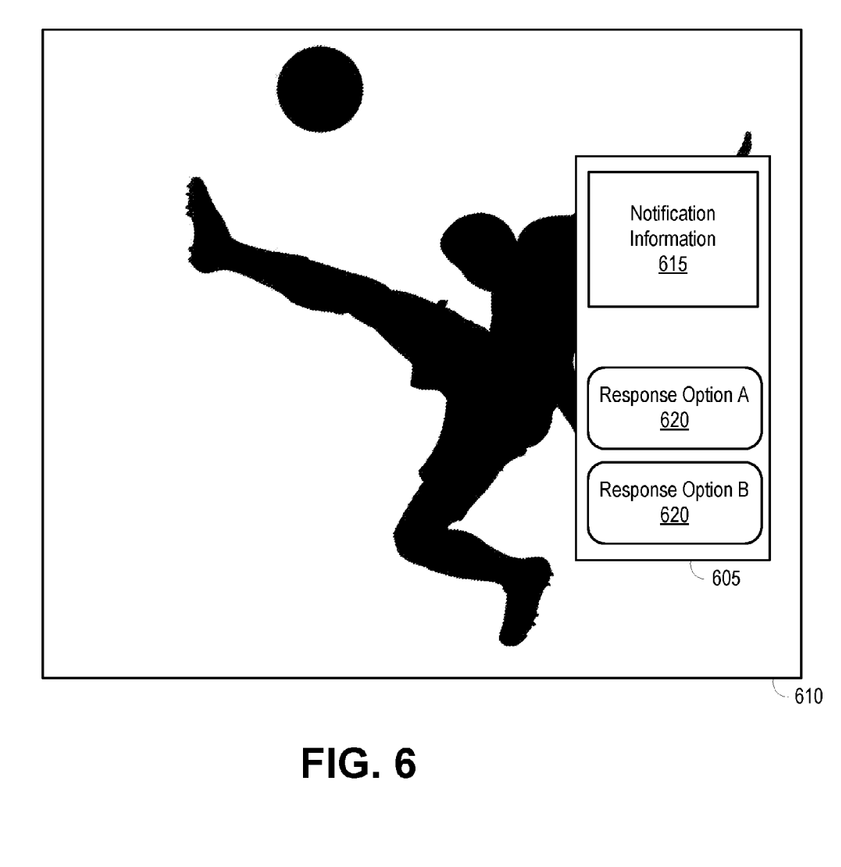
FIG. 6 is an illustration of an example notification window that may be displayed when an alarm event occurs at a device.

FIG. 6 is an illustration of an example notification window 605 that may be displayed when an alarm event occurs at a device. In embodiments, a client device 105 of FIG. 1 (e.g., STB) may receive a notification from another device (e.g., appliance, personal device, home-automation device, etc.) or central device 115 of FIG. 1, and the notification may identify an alarm event that has occurred. It should be understood that a notification may be received at a client device 105 from any device capable of communicating (e.g., via a wired or wireless communication) with the client device 105. It should be further understood that the alarm event identified by a notification may include a wide variety of different types of events including, but not limited to, a certain condition having occurred (e.g., opening a door), a timer expiring at a device (e.g., timer expiring at an IoT device such as an oven, dishwasher, washer/dryer, etc.), a power state/level changing at a device, a low battery/power level at a device, and many others.

The notification window 605 may be output by the client device 105 to a display 610 associated with the client device 105. For example, the display 610 may be presented at a display device (e.g., television) connected to the client device 105. In embodiments, the notification window 605 may be overlaid on top of content (e.g., content being output from the client device 105) that is being displayed within the display 610. For example, the notification 605 may be displayed at an edge of the display 610.

In embodiments, the notification window 605 may include information associated with the alarm event. For example, notification information 615 may be displayed within the notification window 605, and the notification information 615 may include information such as, but not limited to, an identification of the device causing the alarm event, a current state or condition of the device causing the alarm event, a short summary or description of the alarm event, and other information. The notification window 605 may include a notification image that provides an identification of the alarm event and/or the device causing the alarm event. The notification window 605 may include other information such as details associated with responding to the alarm event such as a specific user that is to perform the response, a specific device through which the response is to be performed, and/or a specific duration of time within which the response is to be performed.

In embodiments, the client device 105 may be configured to provide a user with one or more options for responding to an alarm event. For example, the client device 105 may be preconfigured with an association between one or more response options and one or more specific alarm events, or the response options may be provided to the client device 105 along with other information associated with an identified alarm event. Each option for responding to the alarm event may be included within the notification window 605 as a response option 620 (e.g., Response Option A and Response Option B). Each response option 620 may be displayed as a user-selectable button or link, and a user may navigate the response option(s) 620 and select a response option 620 using an RCU or other control interface associated with the client device 105 that is outputting the display of the notification window 605. When the client device 105 receives a user selection of a response option 620, the client device 105 may take an appropriate action according to the selected response option 620. It should be understood that the appropriate action may include, but is not limited to, terminating or modifying the display of the notification window 605, outputting a communication to the device causing the alarm event, wherein the communication instructs the device to take an action corresponding to the selected response option 620, outputting a communication to another device, wherein the communication instructs the device to take an action corresponding to the selected response option 620, and others.

Figure 7:
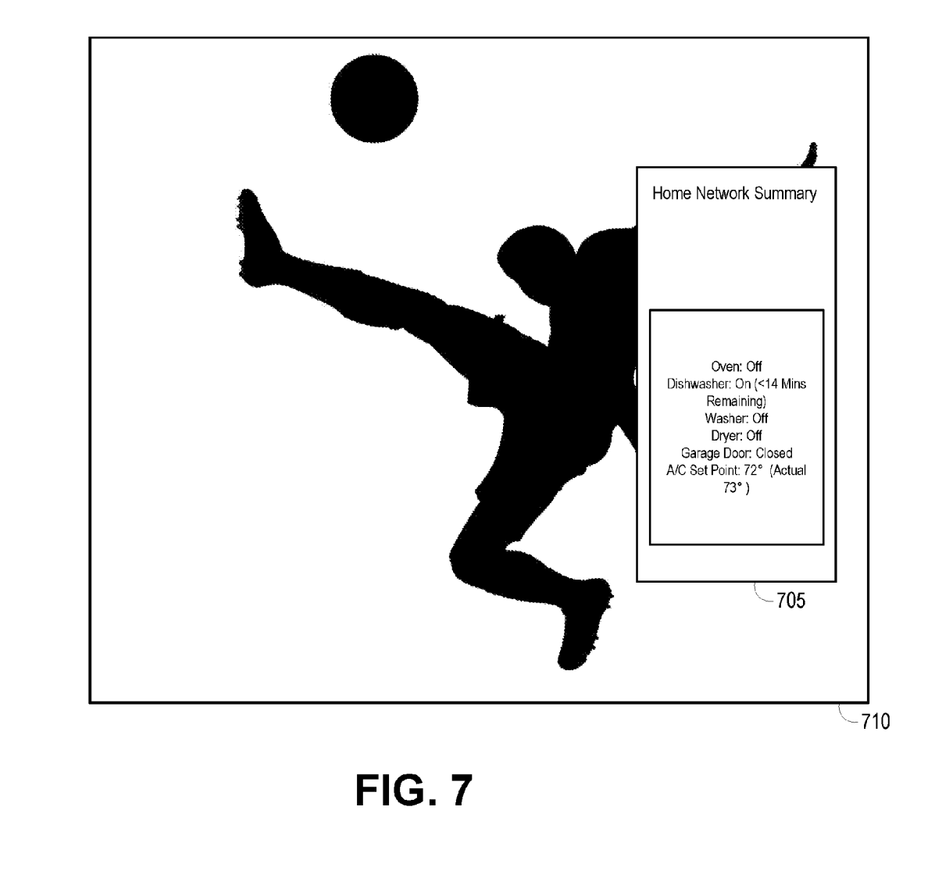
FIG. 7 is an illustration of an example notification window that may be displayed when a home network summary is requested.

FIG. 7 is an illustration of an example notification window 705 that may be displayed when a home network summary is requested. In embodiments, a client device 105 of FIG. 1 (e.g., STB) may receive a request for a home network summary from a user. For example, a request for a home network summary may be received at a STB as a signal from an RCU or other control interface associated with the STB.

In response to receiving a request for a home network summary, the client device 105 may retrieve status information from one or more other devices (e.g., other client devices 105) capable of communicating with the client device 105. The client device 105 (i.e., a STB or other device generating the home network summary) may compile the retrieved status information into the notification window 705.

The notification window 705 may be output by the client device 105 to a display 710 associated with the client device 105. For example, the display 710 may be presented at a display device (e.g., television) connected to the client device 105. In embodiments, the notification window 705 may be overlaid on top of content (e.g., content being output from the client device 105) that is being displayed within the display 710. For example, the notification window 705 may be displayed at an edge of the display 710.

In embodiments, the information displayed within the notification window 705 may include various status information associated with the one or more devices from which status information was retrieved by the client device 105. For example, the status information may include a power state of a device, a remaining duration of a timer associated with a device, a status or condition of a security system or appliance within a premise, and various other information. It will be appreciated by those skilled in the art that different devices may communicate different fields of information to the client device 105 for inclusion within the notification window 705.

Figure 8:
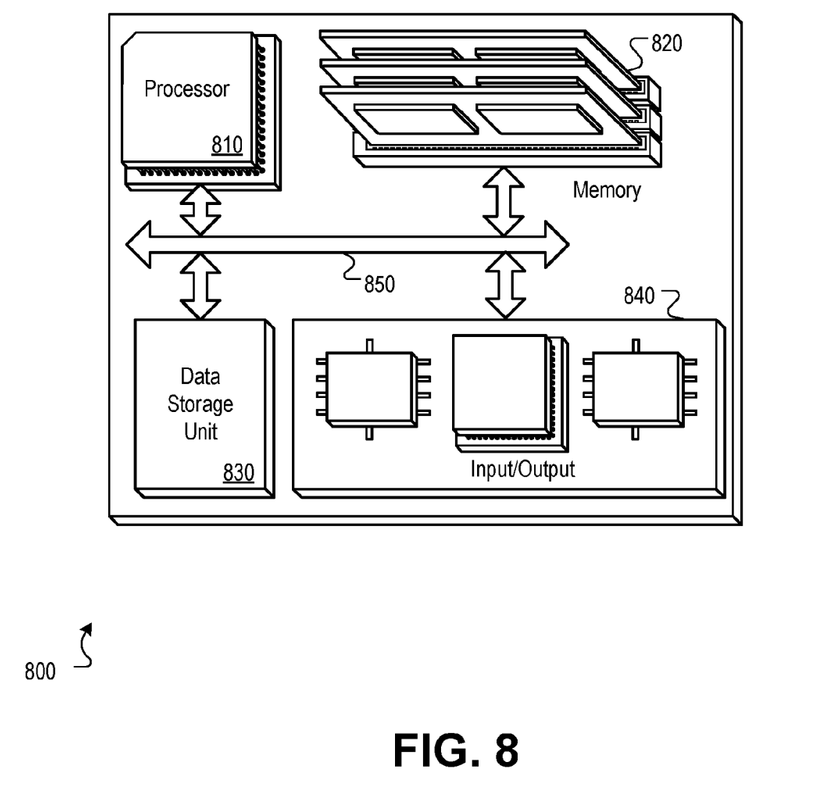
FIG. 8 is a block diagram of a hardware configuration operable to facilitate monitoring and control of one or more network devices via a user interface.

FIG. 8 is a block diagram of a hardware configuration 800 operable to facilitate monitoring and control of one or more network devices via a user interface. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In embodiments, the input/output device 840 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, computer, tablet, mobile device, STB, etc.) or central device 115 of FIG. 1 (e.g., gateway device, cable modem, server, etc.). In embodiments, the input/output device can include driver devices configured to send communications to, and receive communications from one or more networks (e.g., local network 110 of FIG. 1, subscriber network 125 of FIG. 1, WAN 120 of FIG. 1, etc.).

Those skilled in the art will appreciate that the invention improves upon methods and systems for interfacing with network devices of a subscriber premise. Methods, systems, and computer readable media can be operable to facilitate the monitoring and control of one or more network devices via a user interface. One or more network devices capable of communicating with a client device, such as a set-top box (STB) may output a message to the STB upon the occurrence of a predetermined alarm event. The STB may generate a notification including information associated with the alarm event and may output the notification to one or more display devices. The notification may further include one or more options for responding to the alarm event, and the STB may take action according to an option selected by a user.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
   receiving an indication of an alarm event, wherein the indication is received at a first device connected to a local network, wherein the first device comprises a set-top box, and wherein the alarm event comprises a condition occurring at a second device;
   generating, at the first device, a notification window, wherein the notification window comprises information associated with the alarm event;
   outputting the notification window as a user interface to one or more display devices;
   determining that at least one display device of the one or more display devices is in a power off state and switching the at least one display device to a power on state, wherein the at least one display device is switched to a power on state through a high definition multimedia interface of the at least one display device;
   outputting, from the first device, a communication to one or more devices, wherein the communication comprises an audio stream that includes an audible notification that identifies the alarm event, wherein the communication instructs the one or more devices to output the audible notification, wherein the audible notification is laid over an audio track associated with media content being output from the one or more devices;
   receiving an indication that an appropriate action corresponding to the alarm event has been taken; and
   in response to the indication that the appropriate action corresponding to the alarm event has been taken, switching the at least one display device to a power off state, wherein the at least one display device is switched to a power off state through the high definition multimedia interface of the at least one display device.

2. The method of claim 1, wherein the notification window comprises one or more options for responding to the alarm event.

3. The method of claim 2, further comprising:
   receiving a user selection of one of the one or more options for responding to the alarm event; and
   outputting a communication from the first device to the second device, the communication instructing the second device according to the user-selected option for responding to the alarm event.

4. The method of claim 1, wherein the indication is delivered to the first device from the second device as a wireless communication.

5. An apparatus comprising:
   one or more interfaces configured to be used to receive an indication of an alarm event, wherein the alarm event comprises a condition occurring at a client device;
   a notification module configured to generate a notification window, wherein the notification window comprises information associated with the alarm event;
   wherein the notification module is further configured to generate an audio stream that includes an audible notification that identifies the alarm event;
   wherein the one or more interfaces are further configured to output the notification window as a user interface to one or more display devices;
   wherein the notification module is further configured to determine that at least one display device of the one or more display devices is in a power off state and switch the at least one display device to a power on state, wherein the at least one display device is switched to a power on state through a high definition multimedia interface of the at least one display device;
   wherein the one or more interfaces are further configured to be used to output a communication to one or more devices, wherein the communication comprises the audio stream, wherein the communication instructs the one or more devices to output the audible notification, wherein the audible notification is laid over an audio track associated with media content being output from the one or more devices; and
   wherein the notification module is further configured to receive an indication that an appropriate action corresponding to the alarm event has been taken, and in response to the indication that the appropriate action corresponding to the alarm event has been taken, switch the at least one display device to a power off state, wherein the at least one display device is switched to a power off state through the high definition multimedia interface of the at least one display device.

6. The apparatus of claim 5, wherein the notification window comprises one or more options for responding to the alarm event.

7. The apparatus of claim 6, wherein the one or more interfaces are further configured to be used to:
   receive a user selection of one of the one or more options for responding to the alarm event; and
   output a communication to the client device, the communication instructing the client device according to the user-selected option for responding to the alarm event.

8. The apparatus of claim 5, wherein the indication is received at the one or more interfaces from the client device as a wireless communication.

9. One or more non-transitory computer readable media having instructions operable to cause one or more processors to perform the operations comprising:
   receiving an indication of an alarm event, wherein the indication is received at a first device connected to a local network, wherein the first device comprises a set-top box, and wherein the alarm event comprises a condition occurring at a second device;
   generating, at the first device, a notification window, wherein the notification window comprises information associated with the alarm event;

outputting the notification window as a user interface to one or more display devices;

determining that at least one display device of the one or more display devices is in a power off state and switching the at least one display device to a power on state, wherein the at least one display device is switched to a power on state through a high definition multimedia interface of the at least one display device;

outputting, from the first device, a communication to one or more devices, wherein the communication comprises an audio stream that includes an audible notification that identifies the alarm event, wherein the communication instructs the one or more devices to output the audible notification, wherein the audible notification is laid over an audio track associated with media content being output from the one or more devices;

receiving an indication that an appropriate action corresponding to the alarm event has been taken; and in response to the indication that the appropriate action corresponding to the alarm event has been taken, switching the at least one display device to a power off state, wherein the at least one display device is switched to a power off state through the high definition multimedia interface of the at least one display device.

10. The one or more non-transitory computer-readable media of claim 9, wherein the notification window comprises one or more options for responding to the alarm event.

11. The one or more non-transitory computer-readable media of claim 10, wherein the instructions are further operable to cause the one or more processors to perform the operations comprising:

receiving a user selection of one of the one or more options for responding to the alarm event; and outputting a communication from the first device to the second device, the communication instructing the second device according to the user-selected option for responding to the alarm event.

12. The one or more non-transitory computer-readable media of claim 9, wherein the indication is delivered to the first device from the second device as a wireless communication.

* * * * *